Dec. 18, 1923.

A. H. SWEET

BRAKE BAND

Filed Feb. 8, 1923

1,478,070

Inventor;
Alvin H. Sweet,
per [signature]
Attorney.

Patented Dec. 18, 1923.

1,478,070

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed February 8, 1923. Serial No. 617,775.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to brake bands, and particularly when they are housed or relatively inaccessible for relining. The objects of my improvement are, first, to provide a lining that may be removed from, or applied to, a brake band without removing it from its normal position; and, second, to afford facilities for slipping the lining into the band in an axial direction.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1:
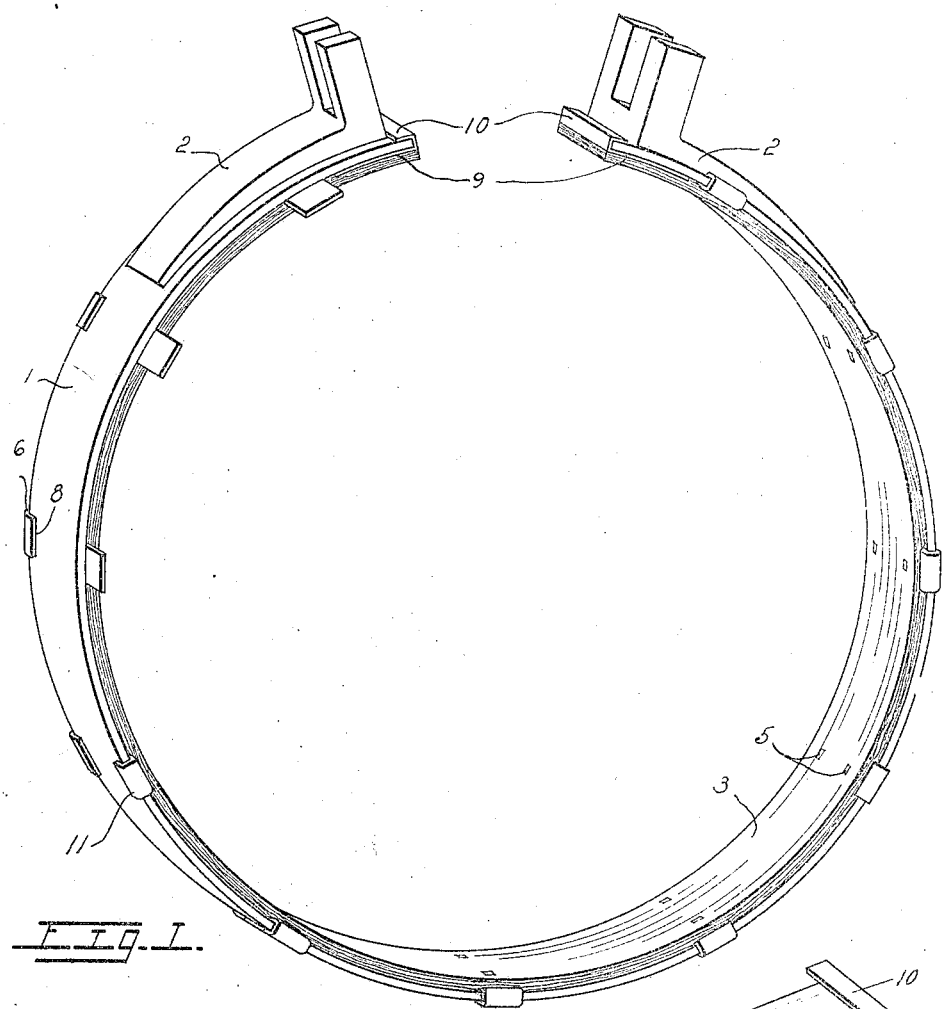
Figure 2:
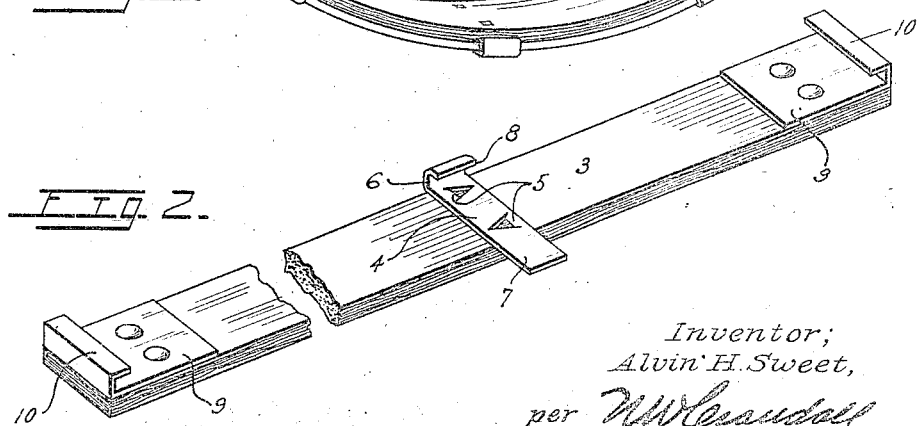

Figure 1 is a perspective view of my improved brake band, and Figure 2 is a similar view of the lining, broken for convenience of illustration into two pieces.

Similar numerals refer to similar parts throughout both views.

The strap 1 may be of any usual or suitable form except that, where the width of end clips 2 is the same or nearly equal to the width of the strap, the inner edges of the former, adjacent the strap, should be channelled or chamfered so as to afford facilities for the edges of the strap to be engaged by the lugs of the lining.

Lining 3 is in the form of a continuous strip and is made up with spaced metal bands 4, transversely disposed, and riveted to the lining by means of clinch points 5 pressed inwardly from the material of these bands. Each of these transverse bands has an outwardly extending integral lug 6 at one end, the other end 7 extending beyond the lining in the same plane. Lug 6 is preferably made with a flange 8 at its outer end for engaging the edge of strap 1.

After the lining is cut to approximately the proper length metal ends 9 are riveted to it at each extremity. These have outwardly extending flanged portions 10 adapted for engaging the ends of the brake strap.

The lining is applied to the strap by slipping it in the latter in an axial direction which flat ends 7 of the transverse bands allow. At the same time the flanges of the metal ends of the lining are made to engage the ends of the brake strap. When in position, with flanges 8 engaging one edge of the strap, the flat ends 7 are bent outwardly around their edge of the strap as shown at 11 in Fig. 1.

The construction and operation of the invention will be clear from the foregoing description. It will also be obvious that the device is relatively inexpensive, and affords means for relining with a minimum of expense.

Certain features of this invention are shown in a previous application filed by me on July 27, 1922, Serial Number 577,985, which has matured into a Patent Number 1,460,118, June 26, 1923, and in companion applications filed coincidently with this. None of these applications however claims what is claimed herein.

I claim:

1. A brake band lining having spaced transverse strips on the back thereof; said strips having an outwardly extending lug at one end for engaging the edge of said band, and a portion extending beyond the edge of said lining at the other end.

2. A brake band lining having spaced transverse strips on the back thereof; said strips having an outwardly extending flanged lug at one end and a portion extending beyond the edge of said lining at the other end adapted to be bent outwardly to form a flanged lug.

3. A brake band lining having spaced transverse strips on the back thereof; said strips having an outwardly extending flanged lug at one end and a portion extending beyond the edge of said lining at the other end adapted to be bent outwardly to form a flanged lug; and means for maintaining said lining in fixed angular relation to said band.

4. A brake band lining having spaced transverse strips on the back thereof; said strips having an outwardly extending flanged lug at one end and a portion extending beyond the edge of said lining at the other end adapted to be bent outwardly to form a flanged lug; and flanged metal ends attached to said lining adapted to engage the ends of said band.

ALVIN H. SWEET.